US011900511B1

(12) United States Patent
Andersen

(10) Patent No.: US 11,900,511 B1
(45) Date of Patent: Feb. 13, 2024

(54) SYSTEMS AND METHODS FOR GRAPHING DATA IN VIRTUAL REALITY ENVIRONMENTS

(71) Applicant: FMR LLC, Boston, MA (US)

(72) Inventor: James Andersen, Boston, MA (US)

(73) Assignee: FMR LLC, Boston, MA (US)

( * ) Notice: Subject to any disclaimer, the term of this patent is extended or adjusted under 35 U.S.C. 154(b) by 0 days.

(21) Appl. No.: 18/077,422

(22) Filed: Dec. 8, 2022

(51) Int. Cl.
| G06T 11/20 | (2006.01) |
| G06F 3/01 | (2006.01) |
| G06F 3/04815 | (2022.01) |
| G06T 13/20 | (2011.01) |
| G06F 3/04847 | (2022.01) |
| G06F 3/04845 | (2022.01) |
| G06T 19/00 | (2011.01) |
| G06F 3/0482 | (2013.01) |

(52) U.S. Cl.
CPC ............ *G06T 11/206* (2013.01); *G06F 3/017* (2013.01); *G06F 3/0482* (2013.01); *G06F 3/04815* (2013.01); *G06F 3/04845* (2013.01); *G06F 3/04847* (2013.01); *G06T 13/20* (2013.01); *G06T 19/00* (2013.01); *G06T 2200/24* (2013.01); *G06T 2219/004* (2013.01); *G06T 2219/024* (2013.01)

(58) Field of Classification Search
CPC ....... G06T 11/206; G06T 13/20; G06T 19/00; G06T 2200/24; G06T 2219/004; G06T 2219/024; G06F 3/017; G06F 3/04815; G06F 3/0482; G06F 3/04845; G06F 3/04847
See application file for complete search history.

(56) References Cited

U.S. PATENT DOCUMENTS

| 11,307,653 | B1* | 4/2022 | Qian ...................... G06F 3/012 |
| 2004/0119749 | A1* | 6/2004 | Luque ..................... H01L 22/20 |
| | | | 257/E21.525 |
| 2006/0227151 | A1* | 10/2006 | Bannai .................... A63F 13/00 |
| | | | 345/633 |
| 2018/0101239 | A1* | 4/2018 | Yin ........................ G06F 3/017 |
| 2019/0050189 | A1* | 2/2019 | Bongiovanni ........... G09G 5/00 |
| 2019/0310760 | A1* | 10/2019 | Cordeil ............... G06F 3/04815 |
| 2019/0324622 | A1* | 10/2019 | Rotgans ................. G06T 13/20 |
| 2020/0310625 | A1* | 10/2020 | Christmas ........... G06F 3/04815 |
| 2021/0042009 | A1* | 2/2021 | McCormack .......... G06T 19/20 |

* cited by examiner

*Primary Examiner* — Grant Sitta
(74) *Attorney, Agent, or Firm* — Cesari and McKenna, LLP

(57) ABSTRACT

Computerized systems and methods are provided for visualizing data in a virtual environment. A three-dimensional virtual display framework is provided within a three-dimensional virtual space, the virtual display framework defined by a three-dimensional volumetric display zone bound by a plurality of surfaces. Data is visualized in 3D within the volumetric display zone of the virtual display framework. Select information is also displayed on at least one of the surfaces of the virtual display framework, where the select information is relevant to the data visualized. In addition, one or more display parameters can be altered in response to hand motions of the user captured to customize display of the virtual display framework. Altering the display parameters is adapted to adjust at least one of the three-dimensional visualization of the data within the volumetric display zone or the display of the select information on the at least one surface.

20 Claims, 5 Drawing Sheets

SYSTEMS AND METHODS FOR GRAPHING DATA IN VIRTUAL REALITY ENVIRONMENTS

TECHNICAL FIELD

This application relates generally to methods and apparatuses for visualizing and manipulating data in a computerized virtual environment, such as a virtual reality (VR) environment.

BACKGROUND

In recent years, hardware such as headsets, adapters, and viewers used in virtual reality (VR), augmented reality (AR) or cross reality (XR) environments have become widely available. In the case of VR, a user sees a visual environment comprised of computer-generated graphical objects, in the case of AR or mixed reality (MR), a user sees a visual environment comprised of both real-world objects and computer-generated graphics, and in the case of XR, a user sees a visual environment encompassing both VR and AR. In each case, the user can interact with the environment by moving his head and/or hands, and the user's movements are captured by the hardware and translated into the computerized environment using specialized software.

A virtual environment provides a user with a comprehensive space to visualize a vast amount of data. However, this can be visually overwhelming to a user, especially when the user does not have a tool to systematically organize and visualize data.

SUMMARY

In view of these challenges, the systems and methods of the present invention provides a virtual three-dimensional (3D) graphing framework for use in a VR, AR or XR environment. The virtual graphing framework creates a new way for users to display data, such as live data from portfolios, crypto currency prices, stock prices, etc. In some embodiments, the virtual graphing framework is a virtual 3D cubic framework that uses data feeds to construct 3D graphs on a visualizing device (e.g., a handheld device or a headset), either in real time as the data is fed or using static, pre-supplied data. By utilizing an additional dimension of depth to graphs beyond a flat visualization, the instant graphing framework can create more intriguing visuals. Inputs and customizations can be made through one or more dynamic screens of the framework. User interactions with the framework can be processed through physical motion and/or voice interactions to enable user manipulation of visualization parameters on whichever virtual platform that is adopted. In situations where eye-tracking is available, data points can be highlighted/illuminated based on where the user is looking relative to the framework. In some embodiments, a variety of custom 3D graphs can be created within the framework, such as line, bar, scatter plot, candlestick, network node graph, etc. This allows the user to look at data in new ways, such as by adding a dimension of motion and/or time. In some embodiments, the graphs are visualized using physical object types so that they are not just screen representations but virtually solid objects. In some embodiments, the 3D graphing framework is viewable by multiple users as a way to share and discuss the displayed data. In an exemplary implementation, the graphing framework of the present invention is displayed on a handheld portable device, such as a smartphone that has a holographic screen. A surface of the framework can display news, insights, customization features, etc. and functions like a touch screen interface. The framework can also display voice interaction options that allow a user to control the framework with voice commands.

The invention, in one aspect, features a computerized method of visualizing data in a virtual environment using a computing system that includes a viewing device wearable by a user, a computing device and a handheld device. The method includes providing, by the computing system via the viewing device, a three-dimensional virtual display framework within a three-dimensional virtual space. The virtual display framework is defined by a three-dimensional volumetric display zone bound by a plurality of surfaces. The method also includes visualizing in 3D, by the computing system via the viewing device, the data within the volumetric display zone of the virtual display framework and displaying, by the computing system via the viewing device, select information on at least one of the surfaces of the virtual display framework. The select information is relevant to the data visualized in the volumetric display zone. The method further includes capturing, by computing system via the handheld device, hand motions of the user to customize display of the virtual display framework and altering, by the computing system, one or more display parameters in response to the hand motions of the user to adjust at least one of the three-dimensional visualization of the data within the volumetric display zone or the display of the select information on the at least one surface.

The invention, in another aspect, features a computerized system for visualizing data in a computerized virtual environment. The computerized system includes a viewing device that displays, to a user of the viewing device, a three-dimensional virtual display framework within a three-dimensional virtual space. The virtual display framework is defined by a three-dimensional volumetric display zone bound by a plurality of surfaces. The system also includes a handheld device configured to capture hand motions of the user to customize display of the virtual display framework within the virtual space and a computing system coupled to the viewing device and the handheld device. The computing system is configured to cause to visualize in 3D the data within the volumetric display zone of the virtual display framework, cause to display select information on at least one of the surfaces of the virtual display framework, the select information being relevant to the data visualized in the volumetric display zone, and alter one or more display parameters in response to the captured hand motions of the user to adjust at least one of the three-dimensional visualization of the data within the volumetric display zone or the display of the select information on the at least one surface.

Any of the above aspects can include one or more of the following features. In some embodiments, the three-dimensional virtual display framework is a cube, the data is visualized in 3D within the cubic volumetric display zone, and the select information is displayed on at least one side surface of the cube. In some embodiments, the data is visualized within the volumetric display zone as one of a 3D bar graph, line graph, scatter plot, candlestick chart, heat map, node network, or earth globe. In some embodiments, a 2D label displaying additional information related to the 3D data visualization in the volumetric display zone is inserted in the volumetric display zone of the virtual display framework.

In some embodiments, the computing device receives the data from an external source and visualize the data in the three-dimensional volumetric display zone in real time as the data is received. In some embodiments, the visualization of the data is animated in the three-dimensional volumetric display zone.

In some embodiments, the select information displayed on the at least one surface of the virtual display framework comprises at least one of an axis, chart type, data source lookup, or news related to the data visualized in the volumetric display zone. In some embodiments, the select information displayed on the at least one surface comprises a menu of one or more controls for adjusting respective ones of one or more display parameters for visualizing the data within the volumetric display zone.

In some embodiments, a sliding hand motion of the user with respect to a slider control to change at least one of a X, Y or Z axis value is captured and the visualization of the data is re-rendered in the volumetric display zone in compliance with the change in the at least one axis value. In some embodiments, a selection hand motion of the user with respect to a drop-down menu control to change a graph type is captured and the visualization of the data is re-rendered in the volumetric display zone in compliance with the graph type selected. In some embodiments, a rotating hand motion of the user while holding the virtual display framework is captured and a rotational angle of the virtual display framework relative to a line of sight of the user is altered in response.

In some embodiments, the virtual display framework, including the 3D visualization of the data in the volumetric display zone, is shared with a different user to enable both users to see the same virtual display framework in the same virtual space.

In some embodiments, the computing system implements one of a virtual reality platform, augmented reality platform or mixed reality platform/

Other aspects and advantages of the invention will become apparent from the following detailed description, taken in conjunction with the accompanying drawings, illustrating the principles of the invention by way of example only.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

DETAILED DESCRIPTION

Figure 1:
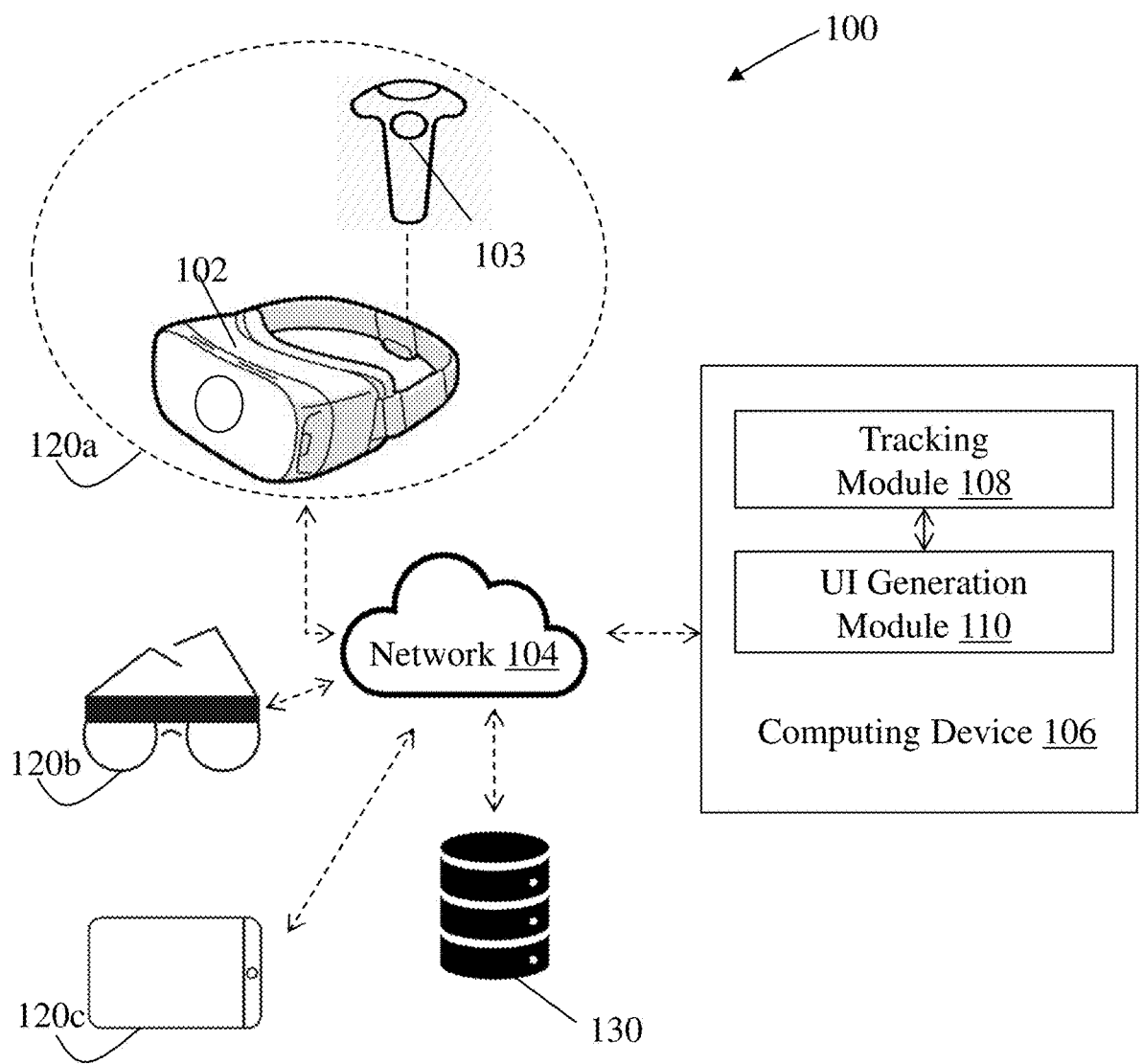
FIG. 1 is a block diagram of a system for enabling visualization of data in a computerized visual environment, according to some embodiments of the present invention.

FIG. 1 is a block diagram of a system 100 for enabling visualization of data in a computerized visual environment, according to some embodiments of the present invention. The system 100 includes one or more client communication devices 120 (such as devices 120a-120c), a communications network 104, a computing device 106 and a database 130.

Each client communication device 120 connects to the communication network 104 to provide inputs from a user (e.g., data visualization requests and display option selections) and receive outputs (e.g., virtual visual content in the desired format). As illustrated, an exemplary client communication device 120a can include a viewing device 102 and a handheld device 103. The viewing device 102 enables a user to view computerized visual content, such as graphics, video, and related user interface elements in AR, VR, MR or XR environments, while the handheld device 103 (e.g., a controller) senses and captures motions of the user's hands as he or she moves within a physical environment. In some embodiments, the viewing device 102 is a headset that a user wears to interact with the computerized visual content. In these embodiments, the headset 102 and the handheld device 103 are equipped with circuitry to, e.g., detect and track movement of the user's head/body and the user's hands. The viewing device 102 and the handheld device 103 can be electrically and/or mechanically coupled together via a network connection. Exemplary headsets include, but are not limited to, the Meta Quest 2™ and Meta Quest Pro AR headset available from Meta Company of San Mateo, California; the VIVE™ VR System available from HTC Corporation of Taiwan; and the HoloLens™ available from Microsoft Corporation of Seattle, Washington. Exemplary handheld devices include, but are not limited to, the VIVE™ VR System available from HTC Corporation of Taiwan and the Oculus Rift™ controllers available from Facebook, Inc. of Menlo Park, California.

It should be appreciated that other embodiments of the viewing device 102 and handheld device 103 can be used within the scope of invention described herein. In some embodiments, the functionalities of the viewing device 102 and the handheld device 103 are integrated in a single physical device, such as a headset with integrated motion sensor to track a user's hand movement 120b or a mobile device 120c (e.g., tablet or smart phone). It should be appreciated that other types of electronic devices that are capable of connecting to the components of the computing system 106 and visualizing virtual content can also be used as client communication devices 120 without departing from the scope of invention.

The network 104 is typically a wide area network, such as the Internet and/or a cellular network. In some embodiments, the network 104 is comprised of several discrete networks and/or sub-networks (e.g., cellular to Internet). In some embodiments, the client computing device 120 can connect to the computing device 106 via a physical connection (e.g., cable).

The computing device 106 is a device including specialized hardware and/or software modules that execute on a processor and interact with memory modules of the server computing device 106, to receive data from other components of the system 100, transmit data to other components of the system 100, and perform functions relating to providing data graphing functions in a computerized visual environment as described herein. The computing device 106 includes a tracking module 108 and a user interface (UI) module 110 that execute on the processor of the server computing device 106. In some embodiments, the modules 108, 110 are specialized sets of computer software instructions programmed onto one or more dedicated processors in the computing device 106 and can include specifically designated memory locations and/or registers for executing the specialized computer software instructions. In some embodiments, the computing device 106 implements one of a virtual reality platform, augmented reality platform or mixed reality platform.

Although the modules 108, 110 are shown in FIG. 1 as executing within the same computing device 106, in some embodiments the functionality of the modules 108, 110 can be distributed among a plurality of computing devices. As shown in FIG. 1, the computing device 106 enables the modules 108, 110 to communicate with each other to exchange data for performing the described functions. It should be appreciated that any number of computing devices, arranged in a variety of architectures, resources, and configurations (e.g., cluster computing, virtual computing, cloud computing) can be used without departing from the scope of the invention. Exemplary functionalities of the modules 108, 110 are described in detail below. Also, it should be appreciated that, in some embodiments, the processing performed by the computing device 106 can be incorporated with a client computing device 120. For example, a headset 102 can include an embedded processor and memory that is programmed with modules 108, 110 to perform the functions described herein.

The database 130 is a computing device (or in some embodiments, a set of computing devices) that is coupled to and in communication with the computing device 106 and/or the one or more client computing devices 120 via the network 104. The database 130 is configured to provide, receive and store various types of data received and/or created for performing virtual graphing and display functions, as described below in detail. In some embodiments, all or a portion of the database 130 is integrated with the computing device 106 or located on a separate computing device or devices. For example, the database 130 can comprise one or more databases, such as MySQL™ available from Oracle Corp. of Redwood City. California.

Figure 2:
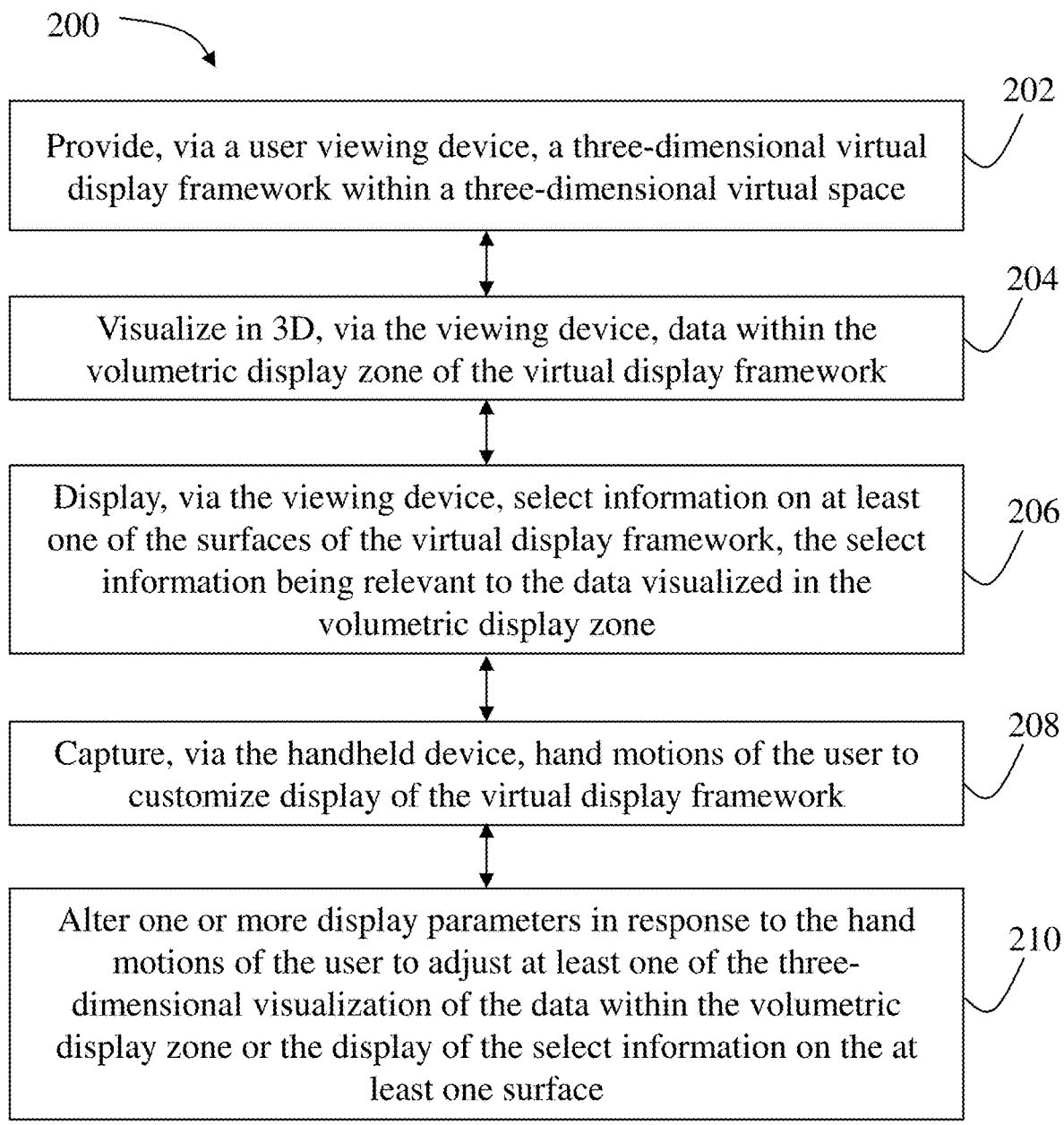
FIG. 2 is a flow diagram of a computerized method for enabling data visualization/graphing in the computerized visual environment using the system of FIG. 1, according to some embodiments of the present invention.
Figure 3:
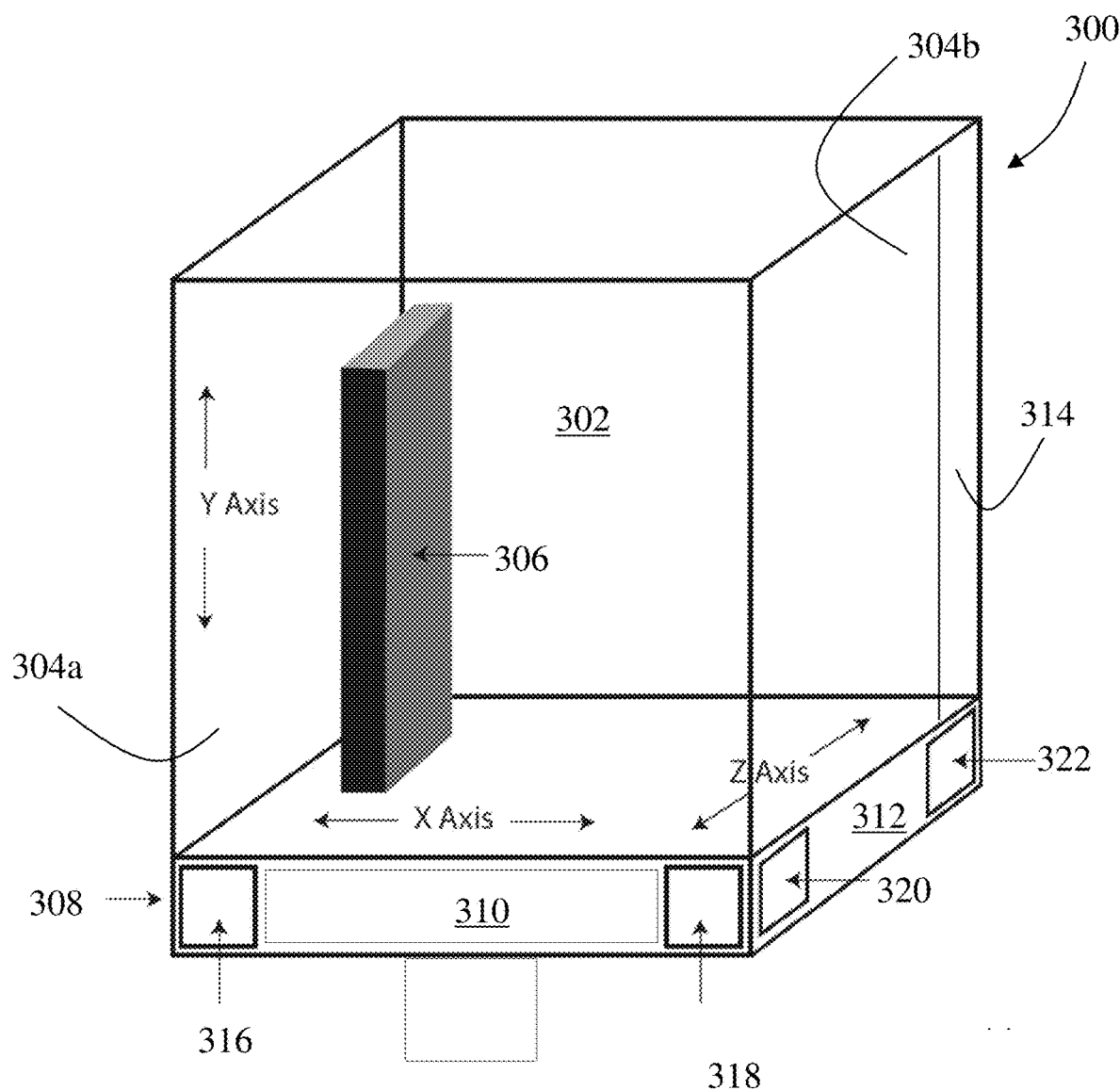
FIG. 3 shows an exemplary three-dimensional virtual display framework produced by the system of FIG. 1 using the computerized method of FIG. 2, according to some embodiments of the present invention.

FIG. 2 is a flow diagram of a computerized method 200 of providing data visualization/graphing functions in a computerized visual environment using the system 100 of FIG. 1, according to some embodiments of the present invention. At step 202, the UI generation module 110 of the computing device 106 is configured to generate a computerized three-dimensional virtual space for display to the user via the user's computing device 120, such as via the viewing device 102 of the user. The virtual space is adapted to include a three-dimensional virtual display framework that is defined by a three-dimensional volumetric display zone bounded by multiple surfaces. For example, the virtual display framework can be a virtual cube, sphere, cylinder, prism, or the like. FIG. 3 shows an exemplary three-dimensional virtual display framework 300 produced by the system 100 of FIG. 1 using the computerized method 200 of FIG. 2, according to some embodiments of the present invention. As shown, the virtual display framework 300 is a cube comprising (i) a central cubic display zone 302 defined by x-, y-, and z-axes, and (ii) six square surfaces 304 that bound the cubic display zone 302.

At step 204, the UI generation module 110 also displays within the virtual framework a three-dimensional graph of a set of data. For example, the three-dimensional graph can be displayed within the volumetric display zone of the virtual framework. The 3D graph of data can be in any graphical format, such as one or more of a bar graph, line graph (e.g., multiple line graphs place on the z-axis), scatter plot, candlestick chart, ring graph, pie graph, heat map, node network, or earth globe, etc. In addition, the 3D graph of data can be a 3D object, such as a 3D scan or 3D model. In some embodiments, the 3D graph of data within the volumetric display can be animated, such as in a display loop. As shown in the virtual display framework 300 of FIG. 3, the cubic display zone 302 of the framework 300 is configured to display data as a bar graph 306. The bar graph 306 can be drawn as a collection of geometric cubes that are resized along the x-, y- and z-axes to reflect the data values for that data point in the confines of the graph's settings.

The data visualized by the virtual framework can be from one or more external data sources in communication with the computing device 106 via the network 104. In some embodiments, the data feed is curated and stored in the database 130 prior to the computing device 106 visualizing the data. In some embodiments, the data is visualized in the three-dimensional volumetric display zone of the virtual framework in real time (or near real time) as it is received from the one or more data sources. In some embodiments, the computing device 106 is able to store a certain amount of data in the database 130 for retrieval when, for example, an internet connection is not available and the virtual framework is shown as offline.

At step 206, the UI generation module 110 is also configured to display on the virtual three-dimensional framework select information about the data visualized in the central volumetric display zone. For example, the select information can be displayed on one or more of the surfaces of the virtual framework that bound the volumetric display zone. Exemplary select information displayed on the one or more surfaces of the virtual display framework includes at least one of a graph axis setup, chart type, data source identifications, or news related to the data visualized in the volumetric display zone. In general, the information is dynamically displayed on a surface of the virtual framework by the UI generation module 110 based on the type of the graph visualized and/or the nature of data provided.

Using the virtual cubic framework 300 of FIG. 3 as an example, relevant information about the bar graph 306 can be presented on one or more surfaces 304 of the cubic framework 300, such as on one or more surfaces of a cubic base 308 located at the bottom of the framework 300. As shown, the x-axis range and scale 310 of the bar graph 306 can be displayed on a surface 304*a* of the cubic base 308, and the z-axis range and scale 312 of the bar graph 306 can be displayed on another surface 304*b* of the cubic base 308. In addition, the y-axis range and scale 314 of the bar graph 306 can be displayed on a vertical side section of one or more of the surfaces 304 bounding the cubic display zone 302.

Furthermore, at step 210, the UI generation module 110 is configured to adjust the visualization of data in the virtual framework based on hand motions or other physical indications provided by the user, at step 208, to customize/adjust display of the virtual framework. For example, the tracking module 108 of the computing device 106 can track the user's hand motions or other physical manipulations relative to the virtual environment made via the user's communication device 120 (e.g., via the handheld device 103 of the user or a controller) and detect when the user would like to customize/adjust display parameters of the virtual framework.

In some embodiments, the select information displayed on the one or more surfaces of the virtual framework includes a menu or a control that is selectable by the user to alter one or more display parameters for visualizing the data within the volumetric display zone. In some embodiments, the user can utilize voice command to enter or change information displayed in/on the virtual framework. The voice command option can be made available to the user if the virtual framework is online.

Using the exemplary virtual cubic framework 300 of FIG. 3 as an example, the surfaces on the base section 308 of the framework 300 can function as dynamic information display and control surfaces to display not only information relevant to the graph 306 (e.g., axis setup information 310 and 312), but also control elements for changing various aspects of the visualization in the cubic display zone 302. As shown, control elements 316 and 318 (e.g., sliders) on surface 304a of base 308 are engageable by the user to zoom out or zoom in, respectively, on the x-axis values of the 3D graph 306 in the cubic display zone 302. Similarly, control elements 320 and 322 (e.g., sliders) on surface 304b of base 308 are engageable by the user to zoom out or zoom in, respectively, on the z-axis values of the 3D graph 306. Furthermore, there can be control elements (not shown) disposed on at least one surface 304 of the framework 300 that are engageable by the user to zoom out or zoom in on the y-axis values of the 3D graph 306. In response to the user interacting with any one of the control elements 316, 318, 320, 322, the UI generation module 110 is adapted to dynamically re-render the graph of data 306 in compliance with the new parameter(s) selected. For example, the tracking module 108 can detect a user sliding hand motion with respect to any one of the slider controls 316, 318, 320, 322 to change the x-axis, y-axis and/or z-axis data ranges and, in response, the UI generation module 110 can redraw the graph 306 in the cubic display zone 302 to scale with the slider adjustments, thereby allowing the user to zoom into a desired section of the graph 306 for closer inspection. In some embodiments, the user can utilize one or more fingers or pointers to highlight a section of the graph in the volumetric display zone for closer inspection. After detecting such motion by the tracking module 108, the UI generation module 110 is configured to highlight, such as zoom into, the graph displayed in the volumetric display zone and change the x-, y- and/or z-scales accordingly.

In some embodiments, the tracking module 108 can track and capture a rotating hand motion of the user while holding the virtual display framework (e.g., the cubic framework 300 of FIG. 3) and the UI generation module 110 can, in response, alter a rotational angle of the virtual display framework relative to a line of sight of the user to enable the user to view the graph in the framework at the desired angle. In general, the user can rotate and manipulate the framework in the virtual space in all directions similar to holding a physical geometric object.

Figure 4A:
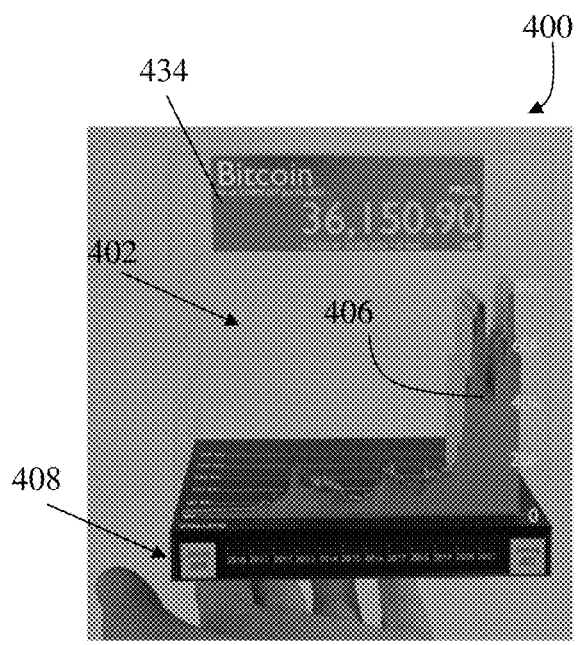
FIGS. 4a-4d show another exemplary three-dimensional virtual display framework produced by the system of FIG. 1 using the computerized method of FIG. 2, according to some embodiments of the present invention.
Figure 4B:
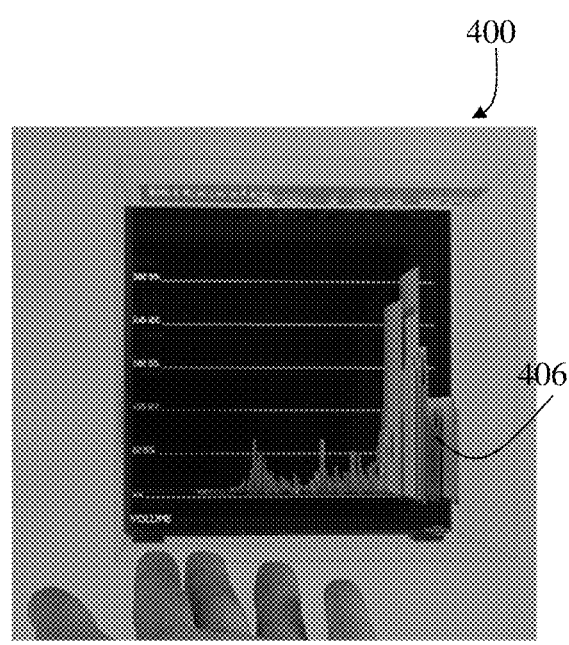

FIGS. 4a-4d show another exemplary three-dimensional virtual display framework 400 produced by the system 100 of FIG. 1 using the computerized method 200 of FIG. 2, according to some embodiments of the present invention. As shown, the cubic framework 400 is configured to plot Bitcoin prices as a surface graph 406 over a set of desired x-, y- and z-data ranges, where the graph 406 is visualized in the central cubic display zone 402 of the framework 400. Similar to the framework 300 of FIG. 3, the framework 400 also includes a cubic base 408 located at the bottom of the framework 400 that in configured to display information, including parameter selection options, related to the Bitcoin graph 406. In general, any of the data display and manipulation techniques described above with reference to the framework 300 of FIG. 3 is applicable to the framework 400 of FIGS. 4a-4d. For example, as shown in FIG. 4b, the framework 400 can be re-oriented to allow the user to view graph 406 from the perspective of the z-axis, in response to a rotating motion of the user.

In some embodiments, a 2D label, such as a suspended screen plane 434 shown in FIG. 4a, is inserted in the volumetric display zone 402 to display information relevant to the graph 406, in addition to the information displayed on the surfaces of the framework 400 (e.g., on the surfaces of the cubic base 408). Exemplary information that can be displayed in the screen plane 434 includes asset name, timestamp, price, online/offline status, etc.

Figure 4C:
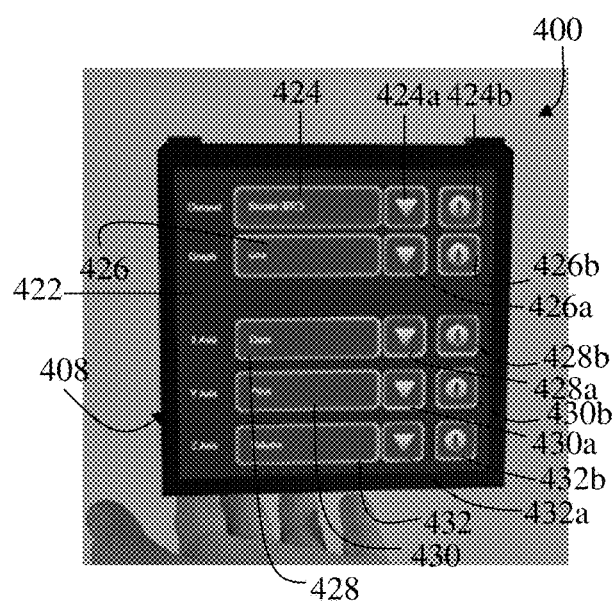

In some embodiments, a portion of one or more surfaces of a virtual 3D display framework is also configured to display information, including parameter selection options, pertinent to the data visualized in the volumetric display zone of the framework. For example, as shown in FIG. 4c, a bottom surface 422 of the cubic base 408 of the virtual cubic framework 400 can be configured as a dynamic control surface presenting one or more menus for adjusting various features of the graph 406 visualized in the cubic display zone 402. This dynamic control surface 422 can be a touch screen that responds to touch/point and scroll gestures of the user with respect to any of the menu options and/or a voice-controlled screen. In some embodiments, the screen 422 represents the main menu area for controlling the volumetric display. As shown in FIG. 4c, drop-down menu 424 displays a list of available online/offline curated data feeds that can be plotted in the cubic display zone 402 based on user touch selection 424a or voice command selection 424b. Drop-down menu 426 displays a list of available plot types selectable by the user based on user touch 426a or voice command 426b. Drop down menus 428, 430, 432 display lists of display features for respective ones of x-, y- and z-axes based on respective ones of user touch selections 428a, 430a, 432a or voice command selections 428b, 430b, 432b. The tracking module 108 can capture an interactive hand motion (or voice command) of the user with respect to any one of the drop-down menus 424-432 and render (or re-rendering) the 3D graph 406 in the volumetric display zone 402 in compliance with the selections. In general, the graph in the volumetric display zone can be individualized and configurable based on the type of data supplied and/or the parameters selected by the user.

Figure 4D:
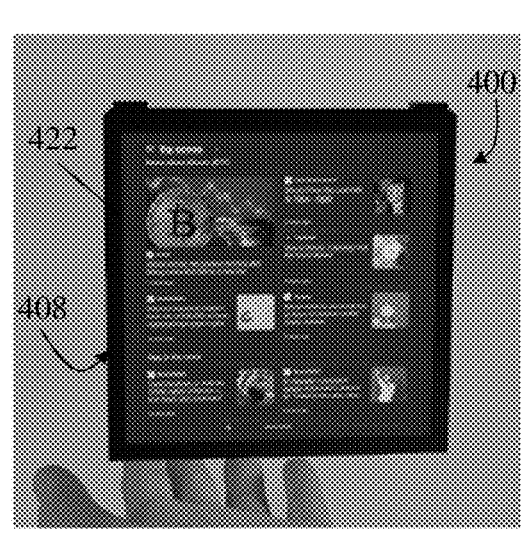

As another example, as shown in FIG. 4d, the bottom surface 422 of the cubic base 408 of the virtual cubic framework 400 can be configured to display news related to the Bitcoin graph 406, such as top bitcoin news of the week. In some embodiments, the bottom surface 422 can change based on the type of graph 406 displayed and/or the desired information the user wishes to view in relation to the graph 406.

Even though menu selections and other relevant data are displayed on the bottom surface 422 of the cubic framework 400 relative to the graph 406, other surface display regions (e.g., top surface, one or more side surfaces, etc.) are equally applicable and are within the scope of the present invention. For example, bottom surface 422 of FIG. 4c or FIG. 4d can be duplicated as a separate panel above the user's non-dominate hand. In addition to displaying graphing parameter adjustment options and/or news stories related to the graph displayed in a virtual framework, other information presentable on a surface of a virtual framework includes graph settings, user preferences, sharing options, updates, options for spawning additional virtual frameworks, close/exit options, etc. For example, the framework can have a setting that allows the user to adjust graph update frequency. In some embodiment, the information displayed by the virtual framework can include an indication of whether the virtual framework is online and being rendered in real time or offline with notation of the age of the displayed data (e.g., a timestamp).

Figure 5:
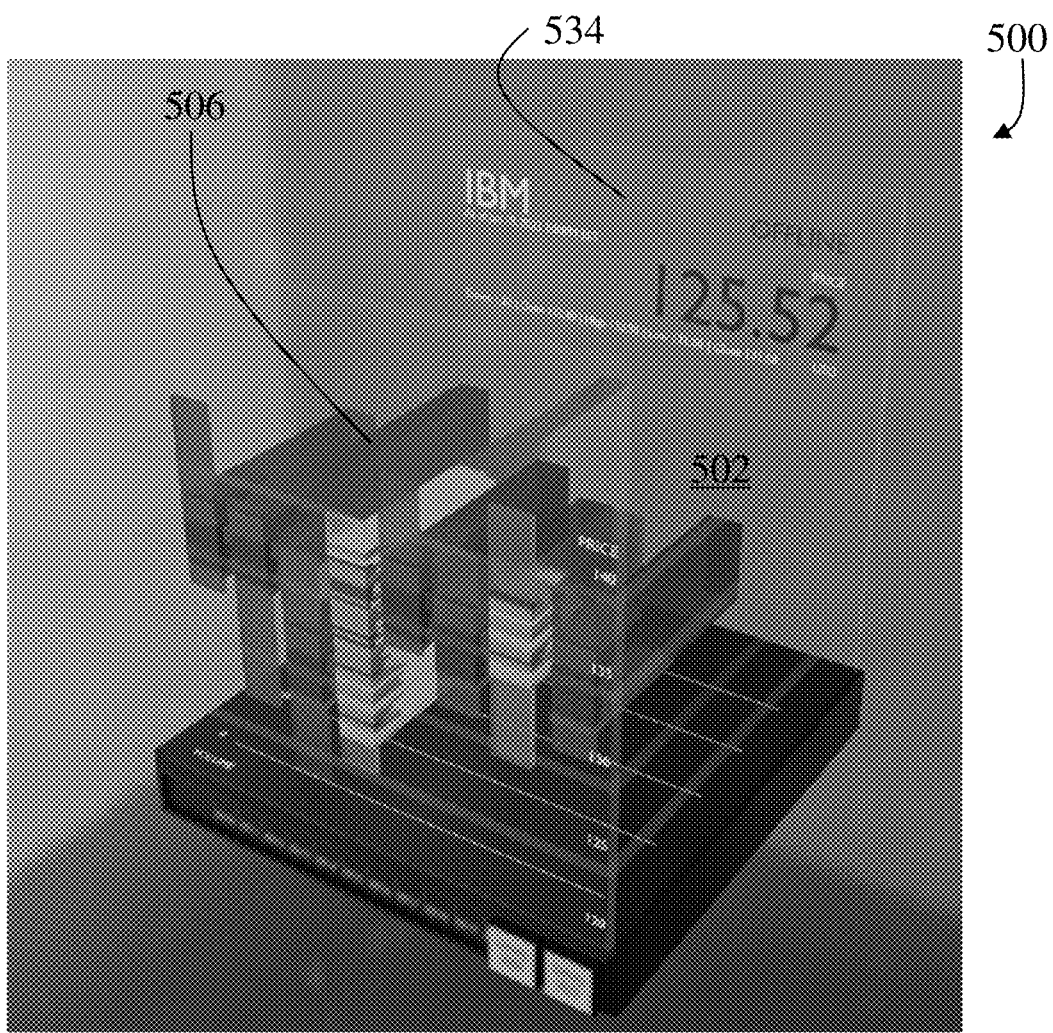
FIG. 5 shows yet another exemplary three-dimensional virtual display framework produced by the system of FIG. 1 using the computerized method of FIG. 2, according to some embodiments of the present invention.

FIG. 5 shows yet another exemplary three-dimensional virtual display framework 500 produced by the system 100 of FIG. 1 using the computerized method 200 of FIG. 2, according to some embodiments of the present invention. As shown, the virtual display framework 500 is cubic in shape and is configured to display in a cubic display zone 502 a candlestick graph 506 of a company's stock price (y-axis) and volume sold (z-axis) over time (x-axis). Nested within the y-axis body of the candlestick graph 506 are volumes represented (z-axis) by the prices within that range stocks were purchased/sold at, as another dimension of volume information. In addition, a suspended screen plane 534 is inserted in the cubic display zone 502 to display information relevant to the graph 506, including the company's name, timestamp, price, online/offline status, etc.

In some embodiments, a virtual 3D framework (e.g., framework 300 of FIG. 3, framework 400 of FIGS. 4a-4d or frame 500 of FIG. 5) generated by the computing device 106 is sharable among multiple users of the same virtual space connected to the network 104 from their respective communication devices 120. Each user can view the same virtual framework from his/her position in the virtual space relative to the main user sharing the framework. In some embodiments, a user associated with a virtual framework can send/share data configurations of the graph displayed in his/her framework (e.g., via email or another electronic transmission means) to another user who is associated with a different virtual space so that the other user can configure his/her framework or viewing system to have substantially the same display. In some embodiments, a user can spawn multiple ones of the 3D framework in the same virtual space and visualize them adjacent to each other for comparison purposes.

In some embodiments, the virtual framework is utilized by a user as a means for displaying information for self-consumption, or in concert with others, to monitor data sets in a 3D virtual container of which any number of graph types can be viewed from any desired angle. In particular, the framework, within its volumetric display zone, can present high-quality, intricate-detailed graph components observable by a user at a close distance. In some embodiments, the user can launch the application for generating the virtual framework as either a stand-alone application or an embedded/encapsulated component within a larger, multiuser metaverse application. A user can quickly switch between different graphs within the same framework (e.g., choosing the desired dataset option 424 and/or the graph type option 426 of FIG. 4c) and show the framework to another user in the same virtual space (e.g., both users wearing headsets 102) even though the two users can be in geographically distant locations. In some embodiments, multiple, inter-related frameworks can be spawned to compare performance of, for example, different funds or different parts of a portfolio. In some embodiments of an augmented reality environment, a virtual framework can be placed in a user's physical space, such as on the user's desk. The framework can alert the user to a specific condition, such as a specific market condition, as the framework rotates through a user's playlist of data that is being monitored. In some embodiments of a virtual reality environment, a user can launch a framework while meeting with others in a virtual space. The user can show the others, for example, the performance of a cryptocurrency (e.g., framework 400 of FIG. 4) to exchange strategies while passing the framework back and forth among each other.

In general, a virtual handheld holographic device as described herein gives a user a way to quickly view various live data sets and 3D objects in a manipulatable package that mimics real life personal devices like smart phones. A user can spawn multiple versions of these same virtual devices to create a collection of them (e.g., data cubes) they then can check on at will and dismiss for later use. These virtual cubes can also be shared in multi-user XR environments to show others and make comparisons with other user's cubes. In the real world, it would be difficult to carry a similar physical 3D device (e.g., a 3-inch cube) in a user's pocket, but a virtual object can be spawned and hidden at will without taking up real world space. As augmented reality devices become more pervasive, this virtual device can be a simple way to view and share 3D content with others.

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites. The computer program can be deployed in a cloud computing environment (e.g., Amazon® AWS, Microsoft® Azure, IBM®).

Method steps can be performed by one or more processors executing a computer program to perform functions of the invention by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, special purpose microprocessors specifically programmed with instructions executable to perform the methods described herein, and any one or more processors of any kind of digital or analog computer. Generally, a processor receives instructions and data from a read-only memory or a random access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computing device in communication with a display device, e.g., a CRT (cathode ray tube), plasma, or LCD (liquid crystal display) monitor, a mobile device display or screen, a holographic device and/or projector, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above-described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, near field communications (NFC) network, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Voice over IP (VOIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, Universal Mobile Telecommunications System (UMTS), 3GPP Long Term Evolution (LTE) and/or other communication protocols.

Devices of the computing system can include, for example, a computer, a computer with a browser device, a telephone, an IP phone, a mobile device (e.g., cellular phone, personal digital assistant (PDA) device, smart phone, tablet, laptop computer, electronic mail device), and/or other communication devices. The browser device includes, for example, a computer (e.g., desktop computer and/or laptop computer) with a World Wide Web browser (e.g., Chrome™ from Google, Inc., Microsoft® Internet Explorer® available from Microsoft Corporation, and/or Mozilla® Firefox available from Mozilla Corporation). Mobile computing device include, for example, a Blackberry® from Research in Motion, an iPhone® from Apple Corporation, and/or an Android™-based device. IP phones include, for example, a Cisco® Unified IP Phone 7985G and/or a Cisco® Unified Wireless Phone 7920 available from Cisco Systems, Inc.

Comprise, include, and/or plural forms of each are open ended and include the listed parts and can include additional parts that are not listed. And/or is open ended and includes one or more of the listed parts and combinations of the listed parts.

One skilled in the art will realize the subject matter may be embodied in other specific forms without departing from the spirit or essential characteristics thereof. The foregoing embodiments are therefore to be considered in all respects illustrative rather than limiting of the subject matter described herein.

What is claimed is:

1. A computerized method of visualizing data in a virtual environment using a computing system that includes a viewing device wearable by a user, a computing device and a handheld device, the method comprising:

providing, by the computing system via the viewing device, a three-dimensional virtual display framework within a three-dimensional virtual space, the virtual display framework illustrating a central three-dimensional volumetric display zone bound by a plurality of surfaces;

visualizing, by the computing system via the viewing device, the data three-dimensionally within the central volumetric display zone of the virtual display framework;

displaying, by the computing system via the viewing device, select information on at least one of the surfaces of the virtual display framework, the select information being chosen based on the data visualized in the volumetric display zone and the display of the select information surrounding at least a portion of the three-dimensional visualization of the data in the central volumetric display zone;

capturing, by computing system via the handheld device, hand motions of the user to customize display of the virtual display framework, wherein the hand motions captured include the user utilizing one or more fingers or pointers to highlight a section of the data visualized within the volumetric display zone; and altering, by the computing system, one or more display parameters in response to the hand motions of the user to adjust at least one of the three-dimensional visualization of the data within the volumetric display zone or the display of the select information on the at least one surface, wherein altering the one or more display parameters include zooming into the section of the data in the volumetric display zone highlighted by the user and adjusting at least one display scale accordingly.

2. The computerized method of claim 1, wherein the three-dimensional virtual display framework is a cube, the data is visualized in 3D within the cubic volumetric display zone, and the select information is displayed on at least one side surface of the cube.

3. The computerized method of claim 1, further comprising:

receiving, by the computing system, the data from an external source; and visualizing, by the computing system, the data in the three-dimensional volumetric display zone in real time as the data is received.

4. The computerized method of claim 3, further comprising animating the visualization of the data in the three-dimensional volumetric display zone.

5. The computerized method of claim 1, wherein the select information displayed on the at least one surface of the virtual display framework comprises at least one of an axis, chart type, data source lookup, or news related to the data visualized in the volumetric display zone.

6. The computerized method of claim 1, wherein the select information displayed on the at least one surface comprises a menu of one or more controls for adjusting respective ones of one or more display parameters for visualizing the data within the volumetric display zone.

7. The computerized method of claim 6, further comprising:

capturing a sliding hand motion of the user with respect to a slider control to change at least one of a X, Y or Z axis value; and re-rendering the visualization of the data in the volumetric display zone in compliance with the change in the at least one axis value.

8. The computerized method of claim 6, further comprising:

capturing a selection hand motion of the user with respect to a drop-down menu control to change a graph type; and re-rendering the visualization of the data in the volumetric display zone in compliance with the graph type selected.

9. The computerized method of claim 1, further comprising:

capturing a rotating hand motion of the user while holding the virtual display framework; and altering in response a rotational angle of the virtual display framework relative to a line of sight of the user.

10. The computerized method of claim 1, wherein the data is visualized within the volumetric display zone as one of a 3D bar graph, line graph, scatter plot, candlestick chart, heat map, node network, or earth globe.

11. The computerized method of claim 1, further comprising sharing the virtual display framework, including the 3D visualization of the data in the volumetric display zone, with a different user to enable both users to see the same virtual display framework in the same virtual space.

12. The computerized method of claim 1, further comprising inserting, in the volumetric display zone of the virtual display framework, a 2D label displaying additional information related to the 3D data visualization in the volumetric display zone.

13. The computerized method of claim 1, wherein the computing system implements one of a virtual reality platform, augmented reality platform or mixed reality platform.

14. A computerized system for visualizing data in a computerized virtual environment, the computerized system comprising:

a viewing device that displays, to a user of the viewing device, a three-dimensional virtual display framework within a three-dimensional virtual space, the virtual display framework illustrating a central three-dimensional volumetric display zone bound by a plurality of surfaces;

a handheld device configured to capture hand motions of the user to customize display of the virtual display framework within the virtual space, wherein the hand motions captured by the handheld device include the user utilizing one or more fingers or pointers to highlight a section of the data visualized within the volumetric display zone; and a computing system coupled to the viewing device and the handheld device, the computing system configured to:

cause to visualize the data three-dimensionally within the central volumetric display zone of the virtual display framework;

cause to display select information on at least one of the surfaces of the virtual display framework, the select information chosen based on the data visualized in the volumetric display zone and the display of the select information surrounding at least a portion of the three-dimensional visualization of the data in the central volumetric display zone; and alter one or more display parameters in response to the captured hand motions of the user to adjust at least one of the three-dimensional visualization of the data within the volumetric display zone or the display of the select information on the at least one surface, wherein alter the one or more display parameters include zoom into the section of the data in the volumetric display zone highlighted by the user and adjust at least one display scale accordingly.

15. The computerized system of claim 14, wherein the three-dimensional virtual display framework is a cube, the data is visualized in 3D within the cubic volumetric display zone, and the select information is displayed on at least one side surface of the cube.

16. The computerized system of claim 14, wherein the select information displayed on the at least one surface of the virtual display framework comprises at least one of an axis, chart type, data source lookup, or news related to the data visualized in the volumetric display zone.

17. The computerized system of claim 14, wherein the select information displayed on the at least one surface comprises a menu of one or more controls for adjusting respective ones of one or more display parameters for visualizing the data within the volumetric display zone.

18. The computerized system of claim 14, wherein the data is visualized within the volumetric display zone as one of a 3D bar graph, line graph, scatter plot, candlestick chart, heat map, node network, or earth globe.

19. The computerized system of claim 18, wherein the computing system is adapted to (i) capture a sliding hand motion of the user with respect to a slider control to change at least one of a X, Y or Z axis value and (ii) re-render the visualization of the data in the volumetric display zone in compliance with the change in the at least one axis value.

20. The computerized method of claim 18, wherein the computing system is adapted to (i) capture a selection hand motion of the user with respect to a drop-down menu control to change a graph type and (ii) re-render the visualization of the data in the volumetric display zone in compliance with the graph type selected.

\* \* \* \* \*